US008776647B2

(12) United States Patent
Farrell (10) Patent No.: US 8,776,647 B2
(45) Date of Patent: *Jul. 15, 2014

(54) FENCING TOOL

(71) Applicant: Terry C. Farrell, Conneaut Lake, PA (US)

(72) Inventor: Terry C. Farrell, Conneaut Lake, PA (US)

(73) Assignee: Channellock, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,131

(22) Filed: Jan. 8, 2013

(65) Prior Publication Data

US 2013/0227793 A1 Sep. 5, 2013

Related U.S. Application Data (60) Continuation of application No. 13/311,718, filed on Dec. 6, 2011, now Pat. No. 8,413,555, which is a continuation-in-part of application No. 13/267,431, filed on Oct. 6, 2011, now Pat. No. 8,291,794, which is a continuation-in-part of application No. 12/751,204, filed on Mar. 31, 2010, now Pat. No. 8,065,939, which is a division of application No. 12/419,592, filed on Apr. 7, 2009, now Pat. No. 8,061,239, which is a continuation-in-part of application No. 11/857,010, filed on Sep. 18, 2007, now Pat. No. 8,485,074, which is a continuation-in-part of application No. 11/493,682, filed on Jul. 26, 2006, now abandoned.

(51) Int. Cl.
*B25B 7/22* (2006.01)
*B25F 1/00* (2006.01)

(52) U.S. Cl.
USPC .................................. 81/415; 7/117; 81/427.5

(58) Field of Classification Search
USPC .......... 81/415, 20, 176.1, 176.15; 7/117, 125, 7/138, 143, 144, 166
See application file for complete search history.

(56) References Cited

U.S. PATENT DOCUMENTS

| | | | | |
|---|---|---|---|---|
| 64,662 A | * | 5/1867 | Gold | 7/138 |
| 836,075 A | * | 11/1906 | Loudon | 7/130 |
| 1,949,335 A | | 7/1929 | Settles | |
| 1,739,658 A | * | 12/1929 | Smith | 7/117 |
| D103,579 S | * | 3/1937 | McNaught | D8/28 |
| 2,875,520 A | | 3/1959 | Webster | |
| 3,599,255 A | | 8/1971 | Carroll, Sr. | |
| D281,216 S | * | 11/1985 | Cutliff et al. | D8/26 |
| D311,313 S | * | 10/1990 | Whiteside | D8/17 |
| 4,995,128 A | * | 2/1991 | Montgomery et al. | 7/127 |
| 5,303,748 A | | 4/1994 | Haldemann | |
| 5,351,402 A | * | 10/1994 | Mansfield | 30/120.3 |
| 5,522,290 A | | 6/1996 | Visser et al. | |
| 5,586,584 A | | 12/1996 | Haldemann | |
| 6,050,549 A | | 4/2000 | Foy | |
| 6,820,862 B2 | | 11/2004 | Terzagi | |
| 7,845,254 B2 | * | 12/2010 | Lionel | 7/127 |

(Continued)

*Primary Examiner* — Hadi Shakeri
(74) *Attorney, Agent, or Firm* — Lackenbach Siegel, LLP (57) ABSTRACT

A pliers fencing tool includes a wedge having a through slot for engagement with the rotatably mounted ratcheted sprocket teeth of a fence wire strainer suspended between the fence wire looped ends. Through slot engaged caused the teeth to rotate from a first to a second ratcheted position and thereby strain the fence wire. A grip having a thumb receiving recess and thumb guard is provided between the wedge and the means for pivotably connecting the handles, and the handles are gripped at the grip portion with the wedge distally disposed.

12 Claims, 7 Drawing Sheets

(56) References Cited

U.S. PATENT DOCUMENTS

| | | |
|---|---|---|
| 2002/0063247 A1 | 5/2002 | Terzagi |
| 2006/0156474 A1 | 7/2006 | Gillingham |
| 2010/0051887 A1 | 3/2010 | Wooster et al. |
| 2010/0122419 A1* | 5/2010 | Zupancic-Albin ................ 7/125 |

* cited by examiner

FENCING TOOL

PRIOR RELATED APPLICATIONS

This application is a continuation application of Ser. No. 13/311,718, filed Dec. 6, 2011, now U.S. Pat. No. 8,413,555, which is a continuation-in-part of Ser. No. 13/267,431. Filed Oct. 6, 2011, now U.S. Pat. No. 8,291,794, which is a continuation-in part of divisional patent application Ser. No. 12/751,204, filed Mar. 31, 2010, now U.S. Pat. No. 8,065,939, which is a divisional application of Ser. No. 12/419,592, filed Apr. 7, 2009, now U.S. Pat. No. 8,061,239, which is continuation-in-part of application Ser. No. 11/857,010, filed Sep. 18, 2007, which is a continuation-in-part of application Ser. No. 11/493,682, filed Jul. 26, 2006, and claims priority thereto and incorporates the priority applications herein in their entireties by reference thereto.

FIELD OF THE INVENTION

This invention relates to tools in fencing operations. Specifically, this invention relates to tools for multiple fence wire operations. More specifically, this invention relates to a tool operable with a fence wire strainer.

BACKGROUND AND DISCUSSION OF THE PRIOR ART

Fencing tools having multiple functionalities are disclosed in U.S. Pat. No. 5,303,748, granted Apr. 19, 1994 and U.S. Pat. No. 5,586,584, granted Dec. 24, 1996 to Haldemann. Wire strainers are disclosed in US2002/0063247, published May 30, 2002 to Terzagi and US2010/0051887, published Mar. 4, 2010 to Wooster et al. The foregoing disclosures are incorporated herein in their entireties by reference thereto.

The fencing tool art does not provide effective functionality with fence wire strainers. The fencing tool art desires a tool that retains and does not impair prior fencing functionalities and yet provides effective wire strainer functionality. The present invention provides a solution to the art desired needs as aforesaid.

SUMMARY OF THE INVENTION

The invention, in one aspect, is a fencing tool having multiple functionalities including operability for and in combination with a wire strainer.

The invention, in still another aspect, is a pliers fencing tool that provides wire strainer functionality.

The fencing tool as aforesaid, in one embodiment, includes a handle through hole for operably engaging the rotatable ratcheted sprocket teeth of a wire strainer.

The fencing tool, as aforesaid, in a further aspect, includes a handle wedge for removing fence clips from fence posts.

The fencing tool, in still a further embodiment, includes a T-shaped section grip portion adjacent the wedge, which provides a left or right hand thumb receiving recess and raised portion thumb guard for use in fence wire straining and fence clip removing operations.

The invention, in another aspect, is a method of operability engaging a wire strainer to strain a fence wire with the aforesaid fencing tool. The method includes the following steps:

(i) providing a fencing tool having a first handle and a second handle, and first and second, respective, distally disposed jaws, and a pivot pin for pivotably connecting the handles and respective jaws, so that the tool is disposed in an opened disposition and a closed disposition, and the first handle having a first surface and a second surface being formed with a wedge extending from the second surface upwardly to the first surface terminating at a wedge edge, and also having a through slot extending from the first surface to the second surface; and wherein the first handle first and second surfaces constitute a grip portion;

(ii) gripping the handles at the grip portion so that the first surface is downwardly and facingly disposed to a wire strainer with the wedge edge distally disposed;

(iii) engaging the rotatable ratchet teeth of the fence wire strainer in the through slot; and (iv) moving the tool to exert a force on the engaged ratchet teeth to rotate the ratchet teeth from a first to a second ratcheted position.

DESCRIPTION OF THE PREFERRED EMBODIMENTS

Referring to FIGS. 1-5, there is shown fencing tool 10 of the present invention. Tool 10 includes handles 11 and 12, jaws 13 and 14, and pin or member 15 for pivotably connecting the jaws and handles. Jaw 13 includes fence hammer 16. Jaw 14 includes fence staple starter and puller 17. Fence wire stretcher, splicer and cutter 18, 19 and 20 are construction features of the jaws. The foregoing fencing functionality features are known in commercially available fencing tools.

Handle 11 is formed with wedge 21 having elongated through hole or slot 22, for purposes hereinafter appearing.

Figure 1:
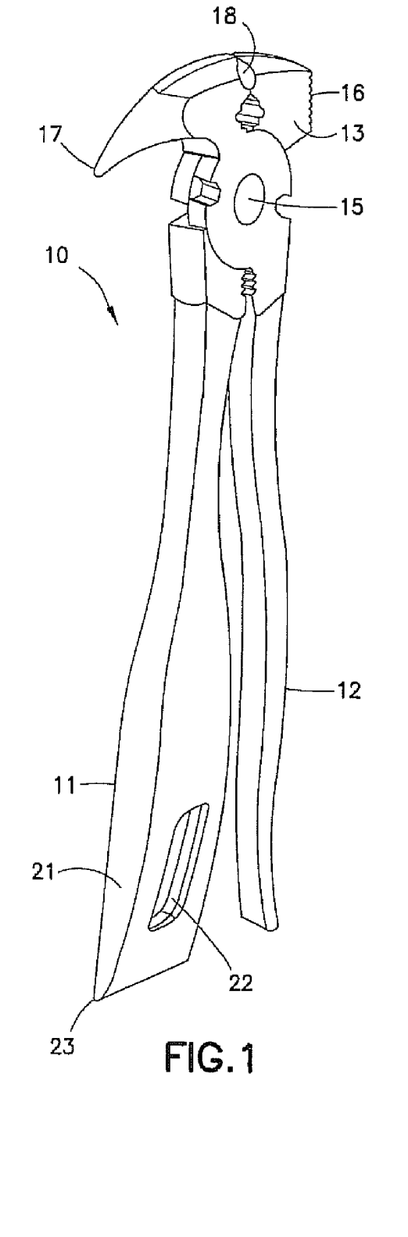
FIG. 1 is a front perspective view of the fencing tool in the closed disposition.
Figure 2:
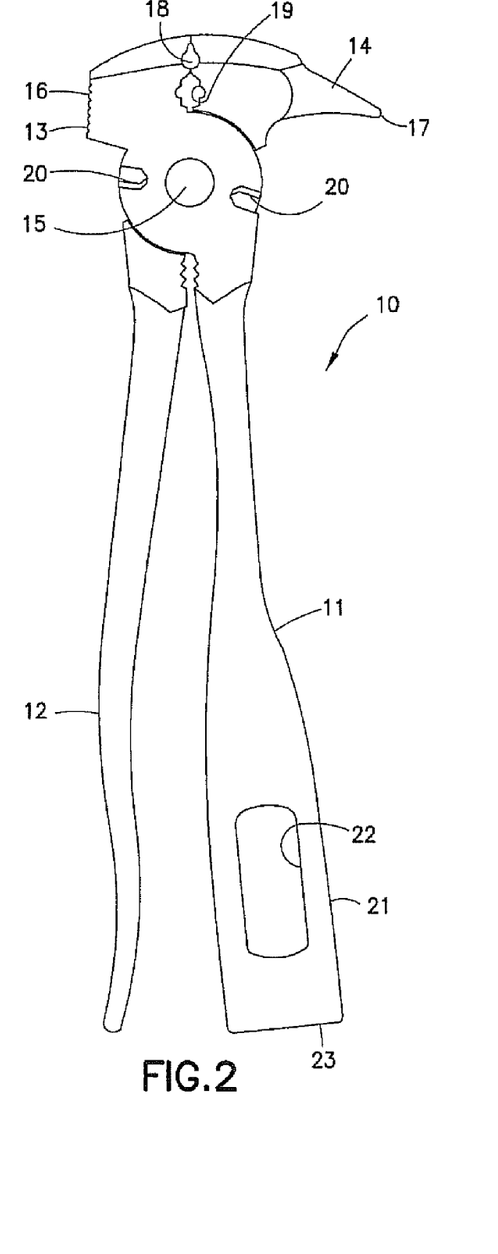
FIG. 2 is a front planar view of the tool of FIG. 1.
Figure 3:
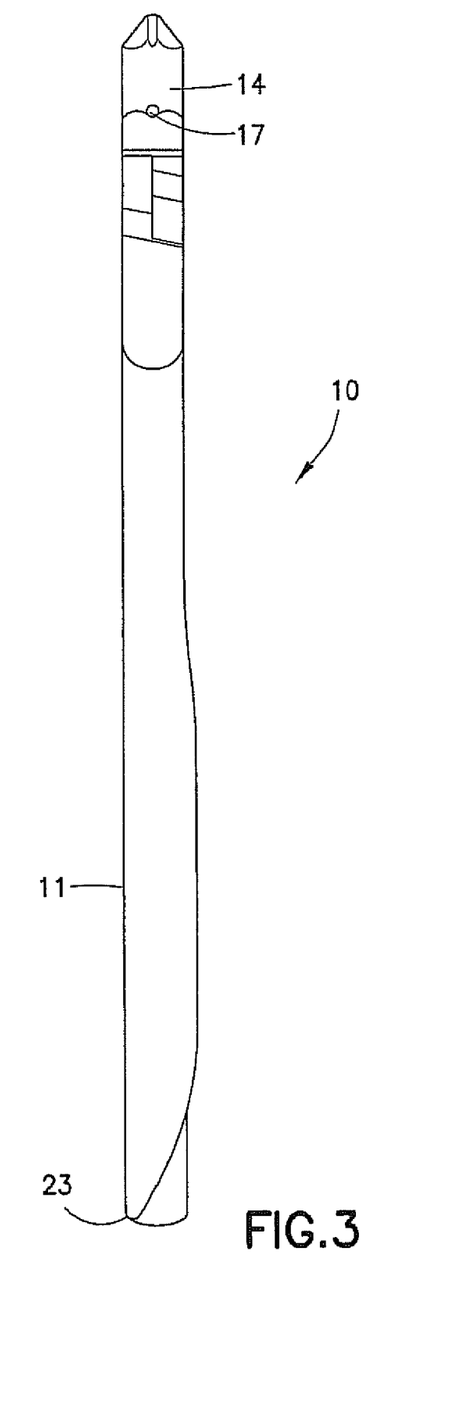
FIG. 3 is a right side view of the tool of FIG. 2.
Figure 4:
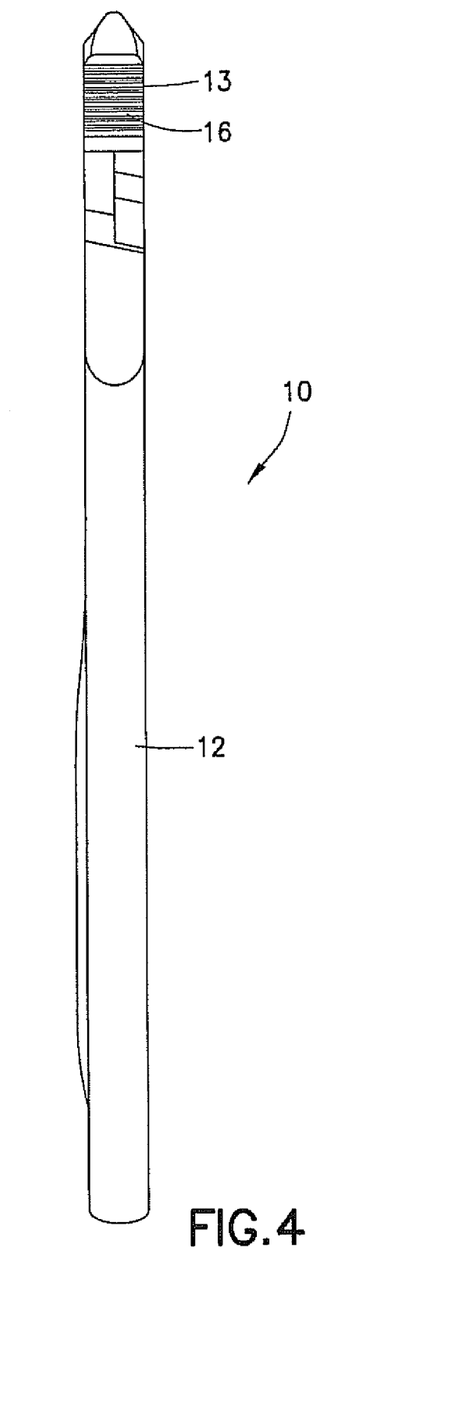
FIG. 4 is a left side view of the tool of FIG. 2.
Figure 5:
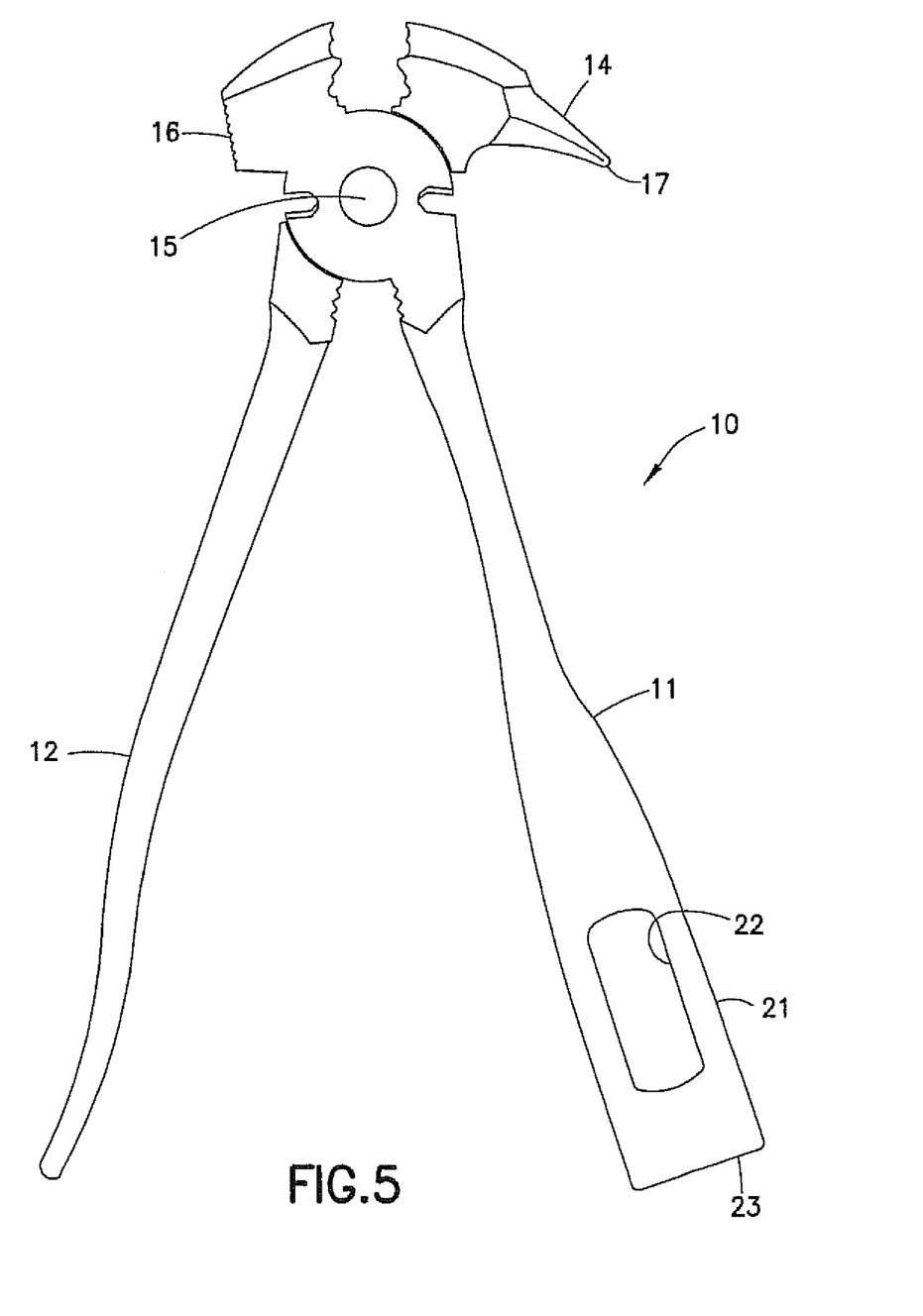
FIG. 5 is a front view as shown in FIG. in the opened disposition.
Figure 6:
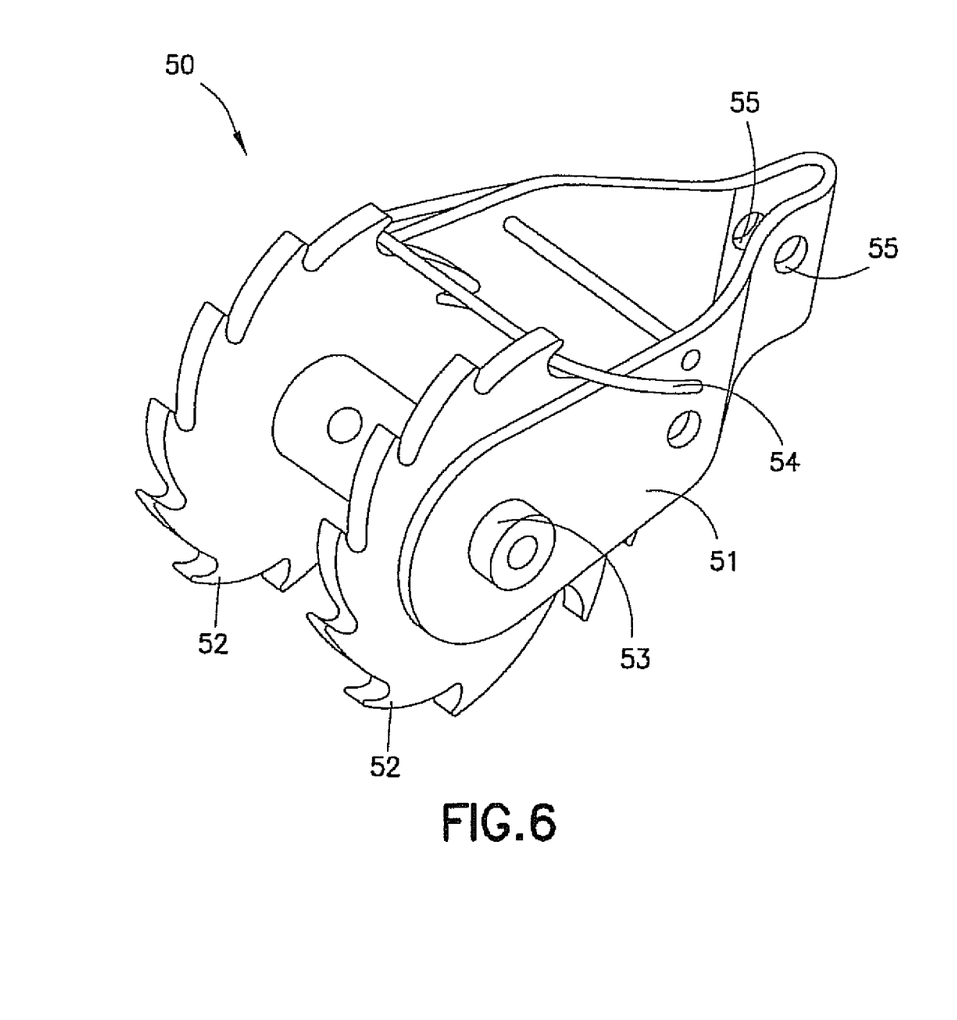
FIG. 6 is a first front perspective view of a wire strainer.
Figure 7:
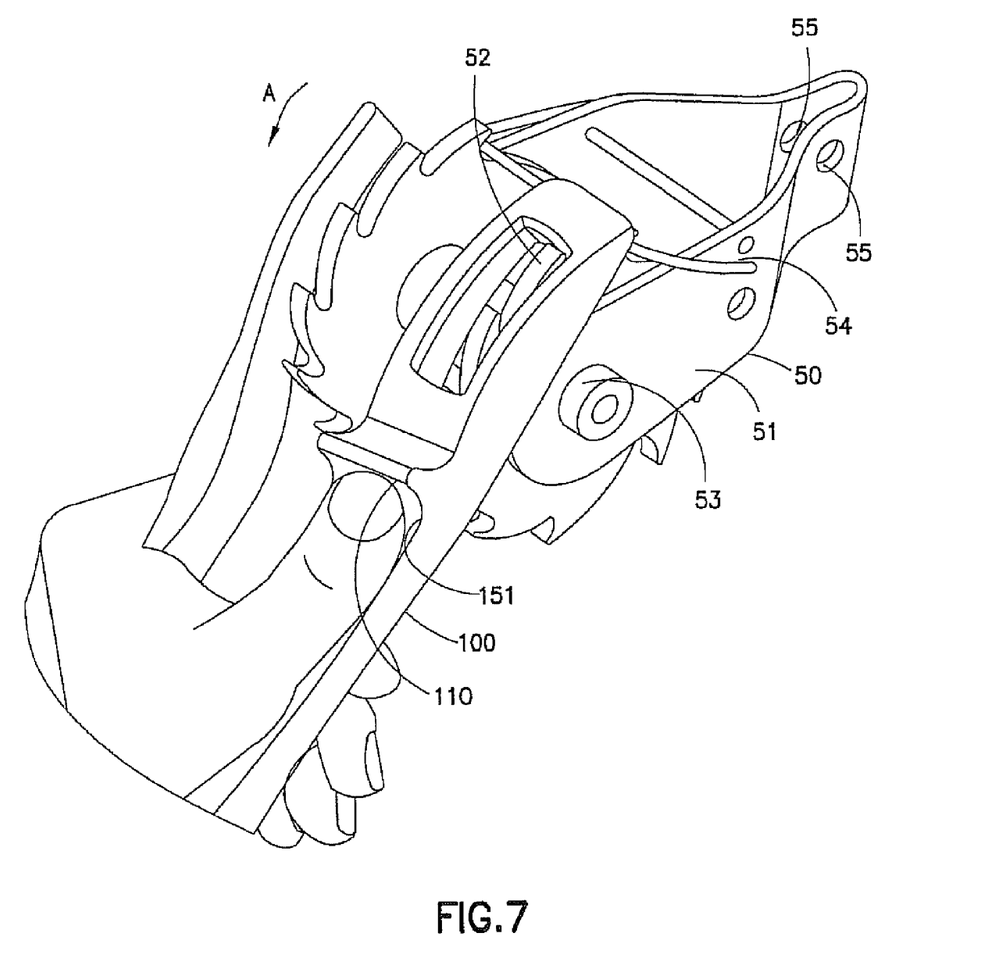
FIG. 7 is a second front perspective view of the wire strainer of FIG. 6 engaged by the wedge slot handle of a second embodiment of the tool as shown in FIGS. 1-5.
Figure 8:
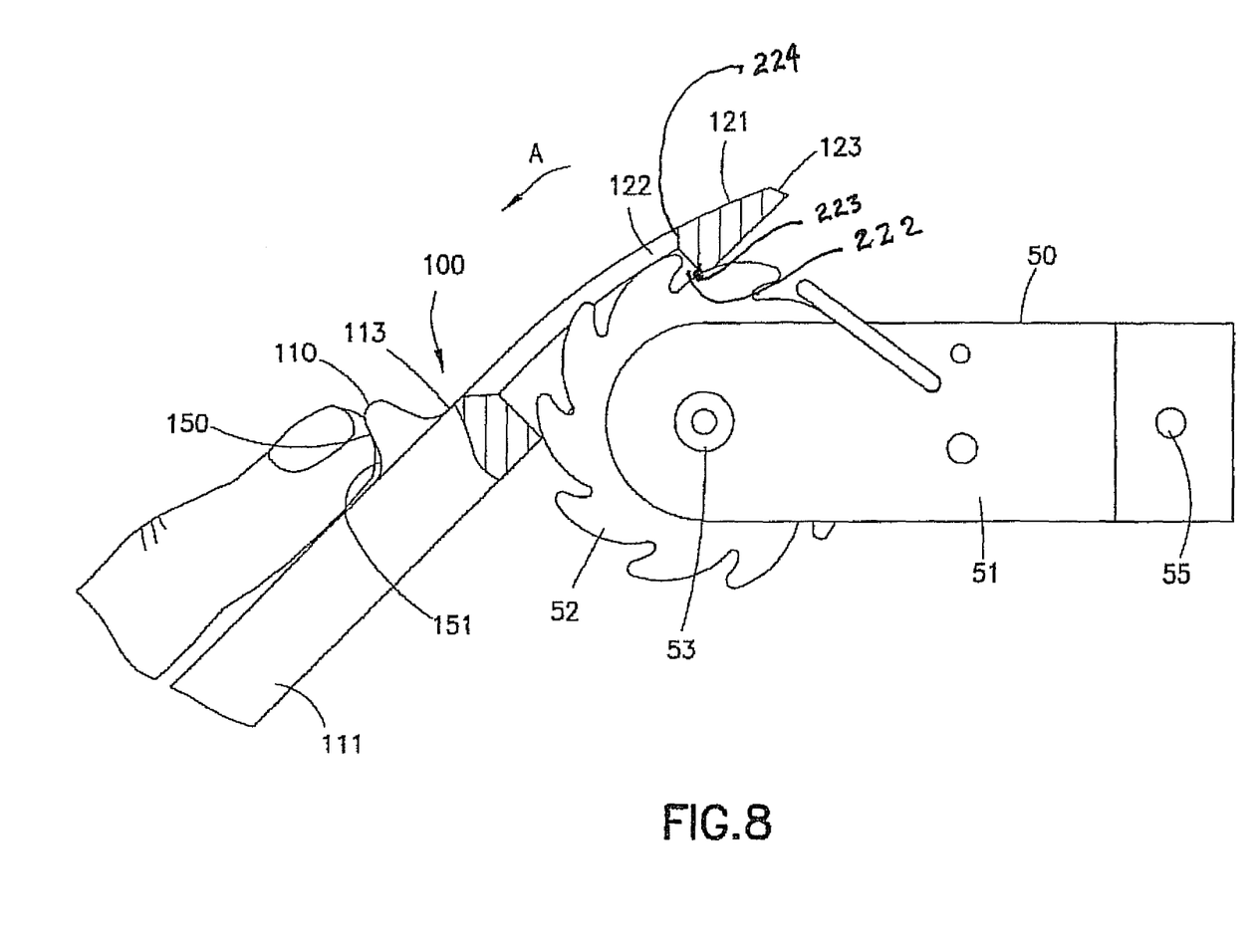
FIG. 8 is a right side elevational view of the tool of FIG. 7.

Referring to FIGS. 6-8, there is shown wire strainer 50. Strainer 50 has frame 51, a pair of discs, each disc is formed with a plurality of ratcheted sprocket teeth 52 disposed on a rotatable spool or pin 53 so as to rotate from a first ratcheted position to a second ratcheted position. Spring lock or compression clip 54 holds the teeth and a wire loop end in a ratcheted position for purposes hereinafter appearing. Aligned through holes 55 enable an anchoring such as a length of a first wire loop end (not shown) to be threaded therethrough. A second wire loop end (not shown) is engaged by the teeth 52. The wire strainer is suspended between the first and second wire loop ends. The teeth when rotatably moved from the first to the second position strains the wire to the desired tension, as is well known in the fencing tool art. Strainer 50 may be one manufactured by Fi-Shock such as a 400-400 cc In Line Strainer with Comp Clip commercially available from Fishock.com or from Flemingoutdoors.com. Strainer 50 may also be the wire strainer as shown and described in US 2010/0051887, published Mar. 4, 2010 to Wooster et al. and in U.S. Pat. No. 6,820,862, granted Nov. 23, 2004 to Terzagi, which references are incorporated herein in their entireties by reference thereto. Like commercially available wire strainers are also within the contemplation of the present invention.

Referring specifically to FIGS. 7 and 8, there is shown the fencing tool 100 and wire strainer 50 combination aspect of the present invention. Tool 100 is constructed as previously described tool 10, including wedge 121, wedge edge 123 and through hole 122, with the following modifications. Outwardly extending member 110 is formed on the bottom surface 113 of handle 111. Member 110 is formed with a grip portion that provides thumb guard 150 and thumb receiving recess 151. In the foregoing manner of construction, with tool 100 in the closed disposition, the user grips handle 111 at grip the portion disposed between the wedge and the means for pivotably connecting the handles with the fingers engaging the adjacent handle in the fully closed position, and the tool 100 contactingly engages at least one of the teeth 52 in through hole or slot 122. The grip portion, thumb guard 150 and thumb receiving recess 151 protect the user's hand from slipping in the following operations. The user then proximately moves or downwardly rotates tool 100 as shown by arrow A so as to provide a leverage force and cause teeth 52 to rotate in the arrow A direction. The teeth on one disc rotate with certain teeth engaging the second wire loop end so that the fence wire strained. The method is repeated until the desired tension is provided to the wires. Only one of the pair of discs has ratchet teeth disc engaged by tool 100. The other disc and pars of ratchet teeth are concomitantly rotated with the engaged disc and teeth.

Referring specifically to FIG. 8, there is shown slot edge 222 which includes elongate planar surface 223 and shorter obtusely angularly disposed surface 224 and the wire strainer teeth do not contact the surface 224 in rotating the tool as shown by angle A.

Figure 9:
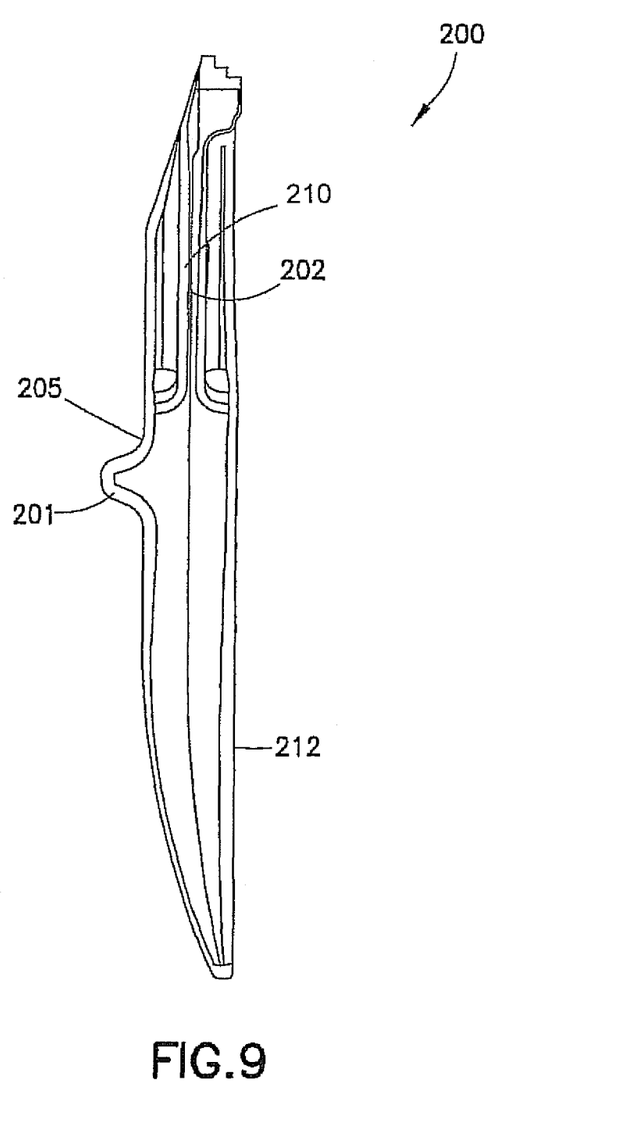
FIG. 9 is a side elevational of a third embodiment of the tool of FIGS. 1-5.

Referring specifically to FIG. 9, there is shown fencing tool 200 which has the fencing tool features of tools 10 and 200, with the following modifications. The embodiment 200 has wedge grip portion 210, and thumb guard 201, and is modified with a T-shaped section 202 disposed between the wedge 212 and the means for pivotally connection the handles. The T-section grip portion of FIG. 9 is shown and disclosed in commonly invented and owned U.S. Ser. No. 13/267,431, filed Oct. 6, 2011, now U.S. Pat. No. 8,291,794, which reference is incorporated herein its entirety by reference thereto. FIG. 9 shows thumb guard 201 and thumb receiving recess 205, formed by T-section 202.

The tool of the present invention, when gripped particularly as shown in e.g. FIGS. 7-8, is particularly useful to have wedge edge inserted beneath the edge of a fence clip (not shown) to quickly remove the fence clip. Fence clips that may be readily removed in the foregoing manner are, by way of example, shown and disclosed in U.S. Pat. No. 6,050,549 to Foy ("Foy"), which reference is incorporated herein in its entirety by reference thereto. That is, the wedge edge may be inserted beneath the bottom edge of the Foy fence clip as shown in FIGS. 4-5 therein to unclip tabs 17 and 18, and thereby readily remove clip 10 from post 15.

While the present invention has been described with respect to certain specific embodiments, it should be understood that modifications and variations of the invention as afore-described might be constructed without departing from the spirit and scope of the invention as defined in the appended claims.

What is claimed is:

1. A fencing tool comprising:
   a first handle and a second handle, having first and second, respective jaws, and means for pivotably connecting the handles and respective jaws, so that the fencing tool is disposed respectively in an opened disposition and a closed disposition, said first handle comprises a first surface and a second surface and being formed with a wedge extending from the second surface upwardly to the first surface terminating at a wedge edge, and having a through slot formed in and fully encompassed by the first handle and extending from the first surface to the second surface and comprising a first surface opening and a second surface opening, said second surface opening being larger than the first surface opening; said through slot being elongate and comprises transversely disposed first and second slot edges, said first slot edge being disposed more adjacent the wedge edge than the second slot edge, said first slot edge comprises a surface for frictionally engaging fence wire strainer teeth;
   wherein with the first slot edge engaged with at least one of a plurality of the fence wire strainer teeth with the wedge first surface downwardly disposed and facingly disposed to the wire strainer, and with the handles gripped in the closed disposition and the wedge edge distally disposed there is provided a first operable position for rotatably moving the strainer teeth disposed in the through slot; and
   said first handle comprises a grip portion adjacent the second slot edge, said grip portion comprises a thumb receiving recess, and said grip portion further comprises a second surface outwardly disposed member disposed between the slot and the grip portion, said outwardly disposed member comprising a thumb guard so that the thumb proximately engages the guard and the guard prevents the thumb from sliding into the slot having the movable teeth.

2. The fencing tool of claim 1, each said handle comprises a T-shaped cross-section.

3. The fencing tool of claim 1, said wedge edge being downwardly disposed in said first operable position.

4. The fencing tool of claim 1, said first slot edge comprises a first wall portion and a second wall portion, said first wall portion being in contacting engagement with the contactingly engaged teeth for transferring movement of the fencing tool to the teeth.

5. The fencing tool of claim 1, said jaws comprise opposed sharpened edges for cutting said wire.

6. The fencing tool of claim 1, said wedge edge being formed for engaging and removing a fence post clip.

7. The fencing tool of claim 1, said first slot edge comprises a first wall portion and a second wall portion, said first wall portion being disposed adjacent the first surface opening and said second wall portion being disposed adjacent the second surface opening, said first wall portion being in contacting engagement with the contactingly engaged teeth for transferring movement of the fencing tool to the teeth, said jaws comprise opposed sharpened edges for cutting said wire; and said wedge edge being formed for engaging and removing a fence post clip.

8. The fencing tool of claim 1, said means for pivotably connecting the handles comprising a pivot axis, said through hole being parallel disposition with the pivot axis.

9. A fencing tool whereby the fence wire strainer teeth are rotatably moved in the elongate slot;
   said first slot edge first surface being planar, said first slot edge second surface being planar.
   a first handle and a second handle, having first and second respective jaws, and means for pivotably connecting the handles and respective jaws, so that the fencing tool is disposed respectively in an opened disposition and a closed disposition, said first handle comprises a first surface and a second surface, and having a through slot extending from the first surface to the second surface; said through slot being elongate and comprises transversely disposed first and second slot edges, said first slot edge comprises a first surface and a second surface, said surfaces being disposed in different planes and the first surface is differently sized than the adjacent second surface;

wherein the first slot edge second surface subtends an obtuse angle with the adjacent first surface and wherein the length of the first slot edge first surface from the first handle first surface to the first slot edge second surface is greater than the length of the first slot edge second surface from the first slot edge first surface to the first handle second surface. so that the first slot edge first surface is disposed to contactingly engage the end a wire strainer tooth and the first slot edge second surface is disposed so as to not contactingly engage the wire strainer teeth;

wherein with the first slot edge first surface engaged with at least one of the fence wire strainer teeth and the handles gripped in the closed disposition, there is provided an operable position for moving the strainer teeth;

said first handle second surface comprises a thumb receiving guard portion disposed between the elongate slot and the means for pivotably connecting the handles, so that thumb is guardedly disposed in rotatably moving the tool and the thumb does not slip and engage the teeth; whereby the fence wire strainer teeth are rotatably moved in the elongate slot.

10. A fencing tool comprising:

a first handle and a second handle, having first and second respective jaws, and means for pivotably connecting the handles and respective jaws, so that the fencing tool is disposed respectively in an opened disposition and a closed disposition, said first handle comprises a first surface and a second surface, and having a through slot extending from the first surface to the second surface; said through slot being elongate and comprises transversely disposed first and second slot edges, said first slot edge comprises a first surface and a second surface, said surfaces being disposed in different planes and the first surface is differently sized than the adjacent second surface; wherein the first slot edge second surface subtends an obtuse angle with the adjacent first surface and wherein the length of the first slot edge first surface from the first handle first surface to the first slot edge second surface is greater than the length of the first slot edge second surface from the first slot edge first surface to the first handle second surface, so that the first slot edge first surface is disposed to contactingly engage the end a of one fence wire strainer tooth and the first slot edge second surface is disposed so as to no contactingly engage the wire strainer teeth;

said first handle second surface comprises a thumb receiving portion disposed between the slot and the means for pivotably connecting the handles so that thumb is disposed away from the means for pivotably connecting the handles and facingly disposed towards the slot in the thumb receiving portion in rotatably moving the tool and in turn the teeth in the slot, wherein the thumb does not slip and engage the teeth; with at the said one fence wire strainer tooth and the handles gripped in the closed disposition with the thumb engaged, there is provided an operable position for moving the fence wire strainer teeth; whereby the fence wire strainer teeth are rotatably moved in the elongate slot.

11. The fencing tool of claim 10, said first slot edge first surface being planar.

12. The fencing tool of claim 10, said first slot edge second surface being planar.

\* \* \* \* \*